United States Patent [19]

Daugherty Jr. et al.

[11] Patent Number: 5,547,089
[45] Date of Patent: Aug. 20, 1996

[54] SLACKLESS DRAWBAR ASSEMBLY UTILIZING A BALL AND RACE ASSEMBLY

[75] Inventors: David W. Daugherty Jr., Bolingbrook; Wajih Kanjo, Lockport, both of Ill.; Michael G. Hawryszkow, Munster, Ind.

[73] Assignee: Westinghouse Air Brake Company, Wilmerding, Pa.

[21] Appl. No.: 308,604

[22] Filed: Sep. 19, 1994

[51] Int. Cl.$^6$ ........................................ B61G 9/00
[52] U.S. Cl. ........................... 213/62 R; 213/61; 213/66
[58] Field of Search ............................ 213/12, 14, 62 R, 213/62 A, 63, 66, 75 R, 74, 75 B, 61; 105/3, 4.1

[56] References Cited

U.S. PATENT DOCUMENTS

| | | | |
|---|---|---|---|
| 1,978,859 | 10/1934 | Draeger | 213/74 |
| 5,042,393 | 8/1991 | Kanjo et al. | 213/75 R |
| 5,065,679 | 11/1991 | Wallace et al. | 213/75 R |
| 5,131,331 | 7/1992 | Lynch et al. | 213/74 |
| 5,232,106 | 8/1993 | Hawthorne et al. | 213/62 R |
| 5,271,511 | 12/1993 | Daugherty et al. | 213/75 R |
| 5,277,323 | 1/1994 | Wallace et al. | 213/75 R |

*Primary Examiner*—Mark T. Le
*Attorney, Agent, or Firm*—James Ray & Associates

[57] ABSTRACT

A slackless drawbar comprising a female member with one end engaging an end of a car body center sill and another end extends outwardly from the center sill end. A cavity formed in such other end defined by inner surfaces of the back wall, top wall and pair of side walls and open at a bottom and outer end thereof. Openings are formed through each side wall. A male member includes a first end movably disposed in such cavity and a second end. An aperture is formed through such male member first end. A portion of a spherical shaped member is disposed in such aperture. A pair of shaft members extend from outer surfaces of such spherical member. A portion of each shaft member is disposed in respective side wall openings. Each shaft member has a flat surface formed thereon. A race having a portion thereof disposed in such aperture and secured to such male member. The race inner surface is disposed around the spherical member. A pair of wedges, a surface of one wedge engages one of such shaft members flat surfaces and another surface of such one wedge engages a flat vertical surface formed on one side wall adjacent a portion of such first opening and a surface of the other wedge engages another of such flat surfaces formed on such shaft members and another surface of such another wedge engages a flat vertical surface formed on a second side wall adjacent a portion of such second opening. A securing device secures such second end of such male member to a second end of another male member.

26 Claims, 2 Drawing Sheets

5,547,089

SLACKLESS DRAWBAR ASSEMBLY UTILIZING A BALL AND RACE ASSEMBLY

CROSS-REFERENCE TO RELATED APPLICATIONS

This application is related to an application titled, "A Female Connection Member For Slackless Drawbar Assembly" which is being filed concurrently herewith. Also, this application is related to an application titled, "Slackless Drawbar Assembly Using A Ball And Race Assembly At Each End Of The Drawbar" issued on Oct. 31, 1995 as U.S. Pat. No. 5,462,179 and an application titled, "A Female Connection Member For A Slackless Drawbar Assembly Using A Ball And Race Assembly" filed on May 4, 1994 and assigned Serial No. 08/238,264 now abandoned and an application titled, "A Male Connection Member For A Slackless Drawbar Assembly Using A Ball And Race Assembly" filed on May 4, 1994 now abandoned and assigned Ser. No. 08/238,263 now abandoned. All of the above-referenced applications are assigned to the assignee of the present invention. Additionally, the disclosure of each of the above-referenced applications is incorporated herein by reference thereto.

FIELD OF THE INVENTION

The present invention relates, in general, to slackless type drawbar assemblies which are presently being extensively used by the railroad industry to couple the adjacently disposed ends of a pair of railway type freight cars together in a substantially semi-permanent manner and, more particularly, this invention relates to an improved slackless type drawbar assembly which is specifically designed to make use of a ball and race assembly disposed substantially adjacent each end of such assembly in order to accomplish the requisite amount of angling movements which is required between such pair of railway freight cars during normal operation on a track structure.

BACKGROUND OF THE INVENTION

Prior to the development of the present invention, as is generally quite well known in the railroad industry, such slackless type drawbar assemblies have been in widespread use for several years to couple together adjacently disposed ends of a pair of railway freight cars in a substantially semi-permanent fashion.

Freight cars coupled together in this particular manner are usually of the type used in the railroad industry in what is most commonly referred to as dedicated service. Such dedicated service type railway cars include; by way of example only, freight cars which are used to haul coal, coke, and/or various other types of raw minerals, light truck and automobile transport carriers, tank cars used for transporting various types of liquids, as well as, freight cars which are often used to transport various types of building materials. A few examples of raw minerals transported in these dedicated service type railway cars include; various ores, cement and stone. The various types of liquids which are known to be transported by such dedicated service type railway cars will at least include a number of different chemicals.

One prior art slackless type drawbar assembly, presently known to applicants, is taught in U.S. Pat. No. 5,000,330. Illustrated therein is a pair of freight cars which have their adjacently disposed ends connected together by the slackless drawbar assembly. This, particular, slackless type drawbar assembly, as illustrated in FIGS. 2 and 3, is constructed in such a manner that will enable it to operate with a positioning apparatus.

This drawbar is manufactured from a metal casting, such as steel, and includes a shank portion. Such shank end portion is provided with a non-rotatable fixed end portion that is movably secured within one end of the center sill portion of the car body member. The shank portion includes a rotatable end portion that is secured within one end of the center sill portion of an adjacently disposed car body member. Each of the fixed end portion and the rotatable end portion of such slackless drawbar assembly extends into pocket castings and follower blocks which differ slightly but otherwise the center sill portions and pocket casting parts of both car body members are substantially identical and are best seen in the enlarged view of FIG. 3A.

The fixed (i.e., non-rotatable) end portion is held in place in the center sill portion of such car body member by a key and against a follower member disposed in a pocket casting. The pocket casting is received within the center sill opening, which is defined at it's inboard end by rear stop members. These rear stop members abut against side wall extensions provided on the pocket casting. A shim member may be disposed intermediate the rear stop members and the side wall extensions of such pocket casting. The shim member may be replaced with a thicker shim member, should excessive wear require the pocket casting to be spaced a further distance from the rear stop members.

The pocket casting includes a cup-like cavity which is formed by an end wall portion and an encircling skirt portion of such pocket casting. Within such cup-like cavity, the end wall portion presents an inclined face which is formed with a generally shallow V-shaped concavity (as best seen in FIG. 2).

As can best be seen in FIG. 3A, there is a wedge shaped member seated in the cup-like cavity. This wedge shaped member is positioned to frictionally bear against the face of the pocket casting. Such wedge shaped member includes an inboard inclined bearing, or friction, surface which is convex-shaped so as to be complementary to the face of the pocket casting. An outboard wedging surface disposed on the wedge shaped member is formed as a shallow V-shaped concavity that bears against a follower block. The follower block member is formed with a complementary inboard wedging convex V-shaped face which is positioned to bear against such concave outboard surface of the wedge shaped member.

One embodiment of the wedge shaped member, as is best seen in FIGS. 9 and 10, is provided with two laterally projecting guide tabs in order to minimize the lateral shifting thereof. Lifting or positioning lugs, of generally hook shape, also project from the sides of such wedge shaped member. Access to both the lugs and the wedge shaped member is made possible by the provision of an access opening or slot formed in the skirt portion of the pocket casting and a corresponding aperture provided in the top web of the center sill portion and in a lower channel member (which supports such pocket casting) thereby enabling the insertion of a tool to engage the lugs of the wedge shaped member without having to remove the pocket casting itself. The wedge shaped member may, also, be vertically positioned by inserting a tool through an opening, or slot, formed in the pocket casting and the side walls (not shown) of the center sill portion.

Another embodiment of such wedge shaped member, as shown in FIG. 3A, is provided with a depending tail piece portion. This tail piece portion of such wedge shaped member extends in a downwardly direction through bottom openings formed in the pocket casting skirt portion and in a lower channel. In this manner, the vertical repositioning of such wedge member is facilitated.

The outboard face of the follower block member is formed with a spherical concave face which matingly engages a convex spherical butt on the fixed end portion of the drawbar shank. Retaining the fixed end portion within the center sill pocket is a key member which extends through slots provided in such center sill side castings and a key slot formed through the drawbar shank.

The key slot end portion is formed with a concave surface which is concentric to the follower block spherical concave face and the convex spherical butt end of the drawbar shank. Seated and bearing against the concave surface is a complementary convex face of a key bearing block. This arrangement facilitates horizontal angling of the drawbar assembly while the fixed end is held by the key. A groove of semicircular cross section along it's edge opposite such convex face is formed in the bearing block. Seated within the groove is a complementary convex edge of the key. A resilient pad is disposed intermediate the top of the key slot and the top face of the key to permit vertical angling of the drawbar assembly while maintaining the key seated in the groove of the bearing block. This facilitates the vertical angling of the drawbar assembly on the key.

The rotatable end of the drawbar assembly is, also, received in a center sill opening of the car body. Within the center sill opening is a pocket casting, having a wedge, and a follower block of structure similar to that described in connection with the stationary or fixed end, although it may extend outwardly of the pocket casting to engage a larger portion of the rotatable end. A shim may be disposed between the rear stop members and the pocket casting wall as, also, described at the fixed end. Similar wedge access slots and apertures are, also, provided in the pocket casting and the top web and sides of the center sill portion.

The rotatable end of the drawbar assembly is formed as a ball having two spherical portions generated from a common center disposed inwardly and outwardly, respectively, of the follower block. These spherical portions are attached to a cylindrical barrel of smaller diameter (to fit within the center sill pocket). The outward spherical surface engages the spherical concave face of the follower block. Retaining the ball end within the center sill pocket is a bottom pulling block segment and an interlocking top pulling block segment (shown in detail in FIGS. 4–8) which engage the inward spherical surface.

The bottom pulling block (as shown in FIGS. 6–8) is generally in the form of a semicircular ring provided with a base portion and a pair of generally upstanding walls portion. The block segment is formed with a concave partially spherical surface which engages the inwardly disposed portion of the spherical ball. The base of the lower pulling block is provided with a generally "V" shaped notch which reduces the lowermost bearing area of the concave surface. All of the spherical surfaces are concentric to lessen the resistance to angling of the drawbar assembly during curve negotiation and the rotary dump operation.

A pair of lug members project from the top of the block and are seated in notches or recesses formed in the upper pulling block segment. Such upper pulling block segment (as shown in FIGS. 4 and 5) is, also, in the general form of a semicircular ring and in which the inner surface is formed as a partially spherical concave surface. This concave surface bears against the inwardly disposed portion of the spherical ball and coacts with the bottom pulling block concave surface to embrace the ball. The upper and lower pulling blocks are formed with complementary semicircular openings through which the shank of the drawbar assembly extends. It is to be noted that the partially spherical surfaces are non-symmetrical with the concave surface of the lower pulling block being notably larger.

Restraining the pulling blocks against longitudinal movement out of the center sill opening is a front stop member. A removable cross plate member is fastened by bolts or the like, across the bottom flanges of the center sill to support the pulling blocks within the opening of such center sill. Channels are, also, removably secured, by bolts or the like, across the center sill to support the pocket casting and the wedge for both the fixed end of the drawbar assembly as well as the rotatable end. This reference considers two features of the construction receiving the drawbar assembly rotatable end to be important. These features are a horizontal shim positioned between the upper pulling block and the top of the center sill, and a cradle positioned on a cross plate to support the drawbar end ball. Both features are illustrated in FIG. 3A and provide means to maintain the pulling blocks, ball and follower in proper orientation.

It is taught that the centers for generating the arcuate surfaces should be horizontally aligned; however when draft (pulling) loads are applied to the drawbar assembly, the ball will tend to rise across the lower pulling block and spread the pulling blocks apart. Should that occur the aforementioned centers for the pulling blocks will separate vertically and lose concentricity with the abutting ball surface portion. The result is to increase resistance to angling and rotation of the drawbar assembly. Additionally, the ball moves so as to cause the wedge member to drop and reposition the follower thereby reducing the available wedge and follower adjustment for wear compensation.

The cradle serves to support the drawbar assembly ball at the proper level for alignment to maintain concentricity with both the follower and pulling block during or immediately after the system is unloaded such as the brief transition from buff to draft loading (or vice versa) or when the car is rotated and the wedge member slightly retracts or during partial disassembly. The cradle has an arcuate surface that is concave to receive the barrel portion of the ball.

Should a slack adjusting wedge member, and/or adjacent parts, become worn to the point such that the wedge member will no longer function to eliminate slack, the wedge member can be lifted by extending a tool through the openings and apertures into engagement with the wedge lugs.

Another method is to insert a tool through the bottom openings in the pocket casting skirt portion and lower channel and applying a vertical force to the bottom of wedge shim, or by pushing upward on a wedge tail piece if so provided. This will allow the worn parts to be spaced further from the rear stop members and a shim member to be disposed between the rear stop members and a the pocket casting wall, or a shim to be replaced with a thicker shim to compensate for dimensional changes in worn but still usable parts. Similarly if it becomes necessary to disconnect the drawbar assembly, this can be is accomplished at either or both ends by lifting the wedge member and removing either, or both, the key and the pulling blocks (by first removing the cross plate).

SUMMARY OF THE INVENTION

The present invention provides significant improvements in slackless type drawbar assemblies which are specifically designed to connect together a pair of adjacently disposed ends of a pair of railway cars in a substantially semi-permanent fashion. The invented slackless type drawbar assembly includes at least one female connection member. Such at least one female connection member has a first end portion. This first end portion has a first predetermined configuration which enables such first end portion to be engaged within an outer end portion of a center sill member disposed on a bottom portion of a car body member of a first railway car and a radially opposed second end portion extending outwardly from the outer end portion of such center sill member. A cavity is formed in the radially opposed second end portion of such at least one female connection member. Such cavity being defined by an inner surface of a back wall portion, having a second predetermined configuration, an inner surface of a top wall portion and an inner surface of each of a pair of side wall portions, each side wall portion having a third predetermined configuration. This cavity is open adjacent at least a portion of a bottom and an outer end of such radially opposed second end portion of the at least one female connection member. A first opening, having a fourth predetermined configuration, is formed through a first one of such pair of side wall portions. In addition, a radially opposed second opening, having a fifth predetermined configuration, is formed through a second one of such pair of side wall portions. There is at least one male connection member provided which has a sixth predetermined configuration. Such at least one male connection member includes a first end portion and a radially opposed second end portion. At least a portion of the first end portion of such at least one male connection member is movably disposed within the cavity formed in such radially opposed second end of such at least one female connection member. An aperture is formed through a predetermined portion of such at least one male connection member adjacent the first end portion thereof. A spherical shaped member, having at least a portion thereof disposed within such aperture formed through the first end portion of such at least one male connection member is provided. There is a pair of substantially horizontally disposed shaft members which extend outwardly for a predetermined distance from radially opposed and substantially vertically disposed outer surfaces of such spherical shaped member. At least a portion of a first one of such pair of shaft members is disposed within the first opening formed through the first one of such pair of side wall portions. Additionally, at least a portion of a second one of such pair of shaft members is disposed within the second opening formed through the second one of such pair of side wall portions. Each respective one of such pair of shaft members has a radially opposed and substantially flat surface portion formed thereon. A race assembly has at least a portion thereof disposed within such aperture and is secured to the first end portion of such at least one male connection member. An inner surface of such race assembly is disposed around such at least a portion of the spherical shaped member which is disposed within such aperture formed in the first end portion of such at least one male connection member. A pair of wedge means, a first surface of a first one of such pair of wedge means is engaged with a first one of such radially opposed and substantially flat surface portions formed on such pair of shaft members and a second surface of such first one of such pair of wedge means is engaged with a substantially flat and vertically disposed surface portion formed on the first one of such pair of side wall portions adjacent a portion of the first opening. Further, a first surface of a second one of such pair of wedge means is engaged with a second one of such radially opposed and substantially flat surface portions formed on such pair of shaft members and a second surface of the second one of such pair of wedges means being engaged with a substantially flat and vertically disposed surface portion formed on the second one of such pair of side wall portions adjacent a portion of the second opening. Finally, there is provided a means engageable with such second end portion of the at least one male connection member and a second end portion of another male connection member for securing such second end portion of the at least one male connection member to the second end portion of such another male connection member thereby forming an improved slackless type drawbar assembly.

OBJECTS OF THE INVENTION

It is, therefore, one of the primary objects of the present invention to provide an improved slackless type drawbar assembly for use in connecting adjacently disposed ends of a pair of railway freight cars together, in a substantially semi-permanent fashion, in which a ball and race assembly is used adjacent each end of such slackless drawbar assembly.

Another important object of the present invention is to provide an improved slackless type drawbar assembly for use in connecting adjacently disposed ends of a pair of railway cars together, in a substantially semi-permanent fashion, which will enable an absolute minimum number of component parts which must move relative to each other to be used, particularly, when compared to the number of movable component parts required in the prior art type slackless drawbar assemblies.

Still another significant object of the present invention is to provide an improved slackless type drawbar assembly for use in connecting adjacently disposed ends of a pair of railway cars together, in a substantially semi-permanent fashion, which will generally require substantially less routine maintenance when compared to the routine maintenance requirements of the prior art type slackless drawbar assemblies.

Yet another object of the present invention is to provide an improved slackless type drawbar assembly for use in connecting adjacently disposed ends of a pair of railway cars together, in a substantially semi-permanent fashion, which will exhibit a relatively long service life when compared to the service life of such prior art type slackless drawbar assemblies.

A further object of the present invention is to provide an improved slackless type drawbar assembly for use in connecting adjacently disposed ends of a pair of railway cars together, in a substantially semi-permanent fashion, which will be significantly more cost effective for the user.

An additional object of the present invention is to provide an improved slackless type drawbar assembly for use in connecting adjacently disposed ends of a pair of railway cars together, in a substantially semi-permanent fashion, which is relatively easy to retrofit into existing railway cars.

Still yet another object of the present invention is to provide an improved slackless type drawbar assembly for use in connecting adjacently disposed ends of a pair of railway cars together, in a substantially semi-permanent fashion, which is significantly lighter in weight than a conventional type coupler arrangement which requires yokes, draft gear, draft key members and follower members.

Yet still another object of the present invention is to provide an improved slackless type drawbar assembly for use in connecting adjacently disposed ends of a pair of railway cars together, in a substantially semi-permanent fashion, which is relatively easy to assemble.

It is a still further object of the present invention to provide an improved slackless type drawbar assembly for use in connecting adjacently disposed ends of a pair of railway cars together, in a substantially semi-permanent fashion, which exhibits an absolute minimum number of frictionally engaged wear surfaces.

An additional object of the present invention is to provide an improved slackless type drawbar assembly for use in connecting adjacently disposed ends of a pair of railway cars together, in a substantially semi-permanent fashion, which does not require any specialized tools and/or other equipment to install on a railway car.

Although a number of specific objects and advantages of the present invention have been described in some detail above, various other objects and advantages of the slackless type drawbar assembly incorporating a ball and race assembly at each end thereof will become much more readily apparent to those persons who are skilled in the railway car coupling art from the following more detailed description of the invention, particularly, when such description is taken in conjunction with both the attached drawing Figures and with the appended claims.

BRIEF DESCRIPTION OF THE PRESENTLY

PREFERRED EMBODIMENTS OF THE INVENTION

Figure 1:
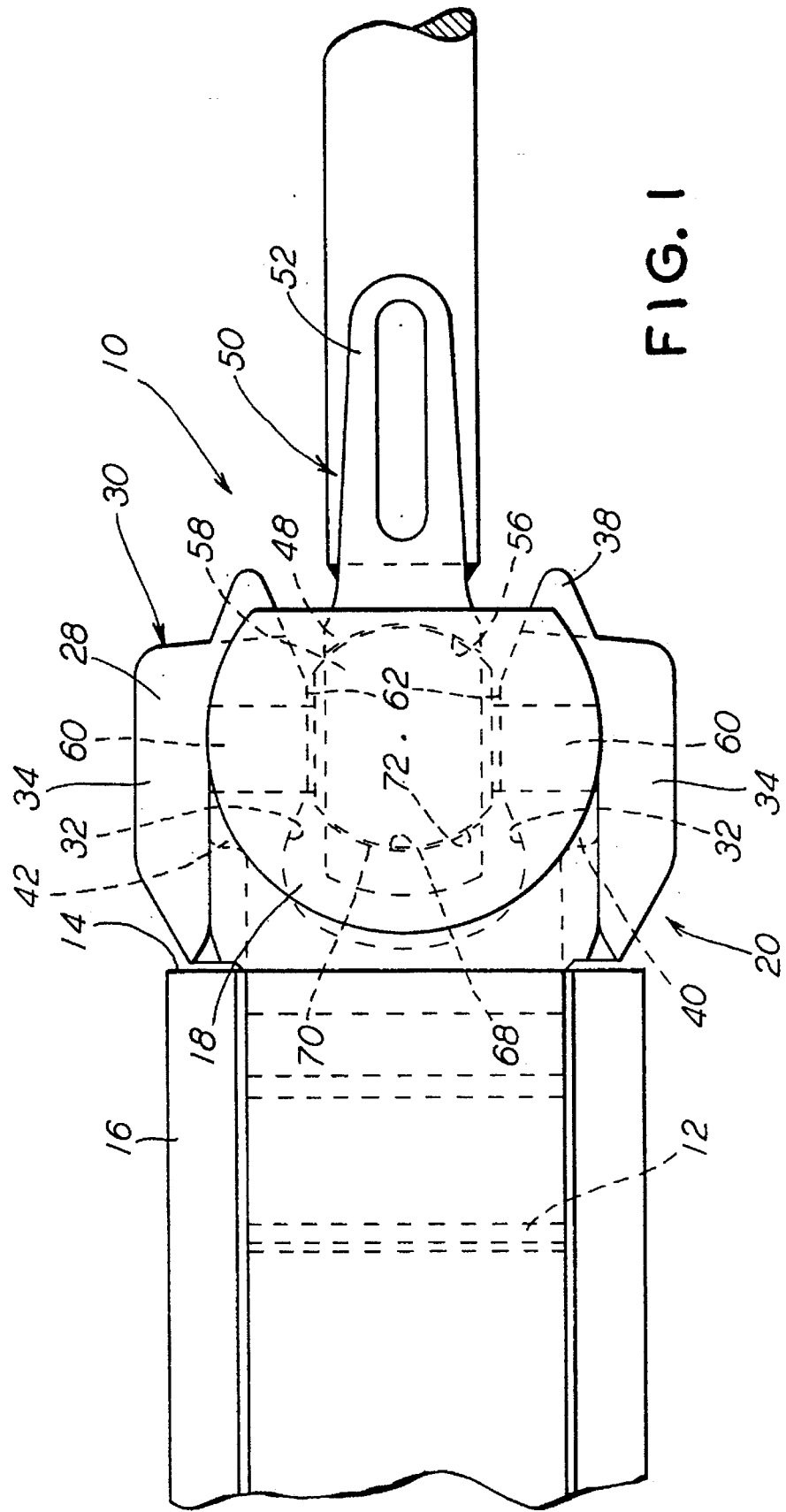
FIG. 1 is a top view which illustrates one presently preferred embodiment of the improved slackless type drawbar assembly constructed according to the present invention.

Prior to proceeding to the more detailed description of the improved slackless type drawbar assembly, according to the present invention, it should first be noted that identical component parts, which have identical functions associated therewith, have been designated with identical reference numerals throughout the views that have been illustrated in the drawings, for the sake of clarity.

Figure 2:
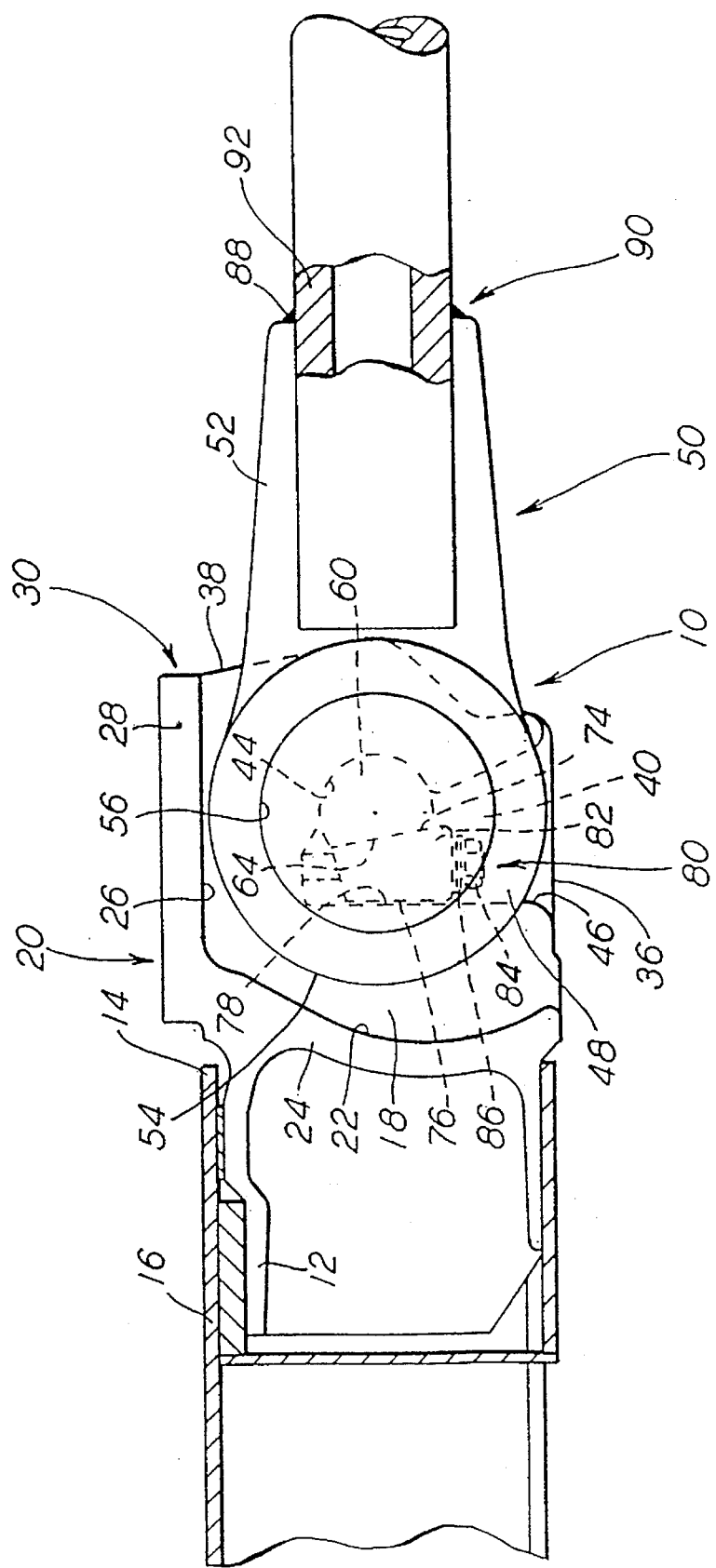
FIG. 2 is a side elevation view, partially in cross section, of such improved slackless type drawbar assembly illustrated in FIG. 1.

Now reference is made, more particularly, to the attached drawing FIGS. 1 and 2. Illustrated therein is a presently preferred embodiment of an improved slackless type drawbar assembly, generally designated, 10 for connecting together the adjacently disposed ends (not shown) of a pair of railway cars (not shown) in a substantially semi-permanent fashion.

Such slackless drawbar assembly 10 includes at least one female connection member, generally designated, 20. Such at least one female connection member 20 includes a first end portion 12, having a first predetermined configuration which enables the first end portion 12 of such at least one female connection member 20 to be disposed within and engaged to an outer end portion 14 of a center sill member 16 disposed on a bottom portion of a car body member (not shown) of a first railway car (not shown), and a radially opposed second end portion, generally designated, 30 which extends outwardly from such outer end portion 14 of the center sill member 16. The first predetermined configuration of such first end portion 12 of the at least one female connection member 20 is, preferably, substantially rectangular in shape. According to the presently preferred embodiment of the invention, such first end portion 12 and the radially opposed second end portion 30 of the at least one female connection member 20 will be formed as an integral single piece casting.

A cavity 18 is formed in the radially opposed second end portion 30 of such at least one female connection member 20. Such cavity 18 being defined by an inner surface 22 of a back wall portion 24, having a second predetermined configuration, an inner surface 26 of a top wall portion 28 and an inner surface 32 of a pair of side wall portions 34, each side wall portion 34 having a third predetermined configuration. Accordingly, such cavity 18 is open adjacent at least a portion of a bottom 36 and an outer end 38 of the radially opposed second end portion 30 of such at least one female connection member 20. In the presently preferred embodiment, the second predetermined configuration of such inner surface 22 of the back wall portion 24 of the cavity 18 formed in such second end portion 30 of the at least one female connection member 20 will be generally concave in at least one of a vertical direction and a horizontal direction. In a still more preferred embodiment, the second predetermined configuration of such inner surface 22 of the back wall portion 24 of such cavity 18 formed in the second end portion 30 of such female connection member 20 will be generally concave in both such vertical direction and such horizontal direction. In addition, the third predetermined configuration of such inner surfaces 32 of each of such pair of side wall portions 34 of the cavity 18 formed in such second end portion 30 of the at least one female connection member 20 will, preferably, be generally convex shaped in at least a horizontal direction. In the more preferred embodiment of the invention, as has been clearly illustrated in the drawing Figures, the third predetermined configuration of such inner surfaces 32 of such each of such pair of side wall portions 34 of cavity 18 formed in the second end portion 30 of such female connection member 20 will be generally convex shaped in both such horizontal direction and a vertical direction.

There is a first opening 40, having a fourth predetermined configuration, formed through a first one of such pair of side wall portions 34. Additionally, there is a radially opposed second opening 42, having a fifth predetermined configuration, formed through a second one of such pair of side wall portions 34. In the presently preferred embodiment of the invention, the fourth predetermined configuration of such first opening 40 formed through the first one of such pair of side wall portions 34 and such fifth predetermined configuration of the radially opposed second opening 42 formed through such second one of such pair of side wall portions 34 will at least include a generally round portion 44 and a generally open bottom portion 46.

Slackless type drawbar assembly 10 further includes at least one male connection member, generally designated, 50 which exhibits a sixth predetermined configuration. Such at least one male connection member 50 includes each of a first end portion 48 and a radially opposed second end portion 52. At least a portion of such first end portion 48 of the at least one male connection member 50 being movably disposed within such cavity 18 formed in the radially opposed second end portion 30 of such at least one female connection member 20. Preferably, the first end portion 48 of such at least one male connection member 50 will include an inner end surface 54, which is disposed facing the inner surface 22 of such back wall portion 24 of the cavity 18 formed in such second end portion 30 of the at least one female connection member 20, which is convex shaped in at least one of a vertical direction and a horizontal direction. It is even more preferred that such first end portion 48 of such at least one male connection member 50 be convex shaped in both such vertical direction and such horizontal direction.

An aperture 56 is formed through a predetermined portion of such at least one male connection member 50 adjacent the first end portion 48 thereof. Preferably, such aperture 56 formed through the predetermined portion of such at least one male connection member 50 adjacent the first end portion 48 thereof will be generally round and will have a first predetermined diameter.

Disposed at least partially within such aperture 56, formed in the first end portion 48 of such at least one male connection member 50, is a spherical shaped member 58. There is a pair of substantially horizontally disposed shaft members 60 extending outwardly for a predetermined distance from radially opposed and substantially vertically disposed outer surfaces 62 of such spherical shaped member 58. At least a portion of a first one of such pair of horizontally disposed shaft members 60 being disposed within such first opening 40 formed through the first one of such pair of side wall portions 34 and at least a portion of a second one of the pair of horizontally disposed shaft members 60 being disposed within such second opening 42 formed through the second one of such pair of side wall portions 34. Each respective one of such pair of shaft members 60 includes a radially opposed and substantially flat surface portion 64 formed thereon. According to the presently preferred embodiment of the invention, the spherical shaped member 58 and the pair of horizontally disposed shaft members 60 will be formed as an integral single piece, preferably, as a forging. Additionally, such spherical shaped member 58 will include a chrome plating on at least a portion of an outer surface thereof. Such at least a portion of such chrome plated outer surface of the spherical shaped member 58 will, preferably, be polished.

A race assembly (not shown) is preferably provided to secure the spherical shaped member 58 to such first end portion 48 of the male connection member 50. In this arrangement, at least a portion of such race assembly is disposed within the aperture 56 in a position such that an inner surface 68 of such race assembly is disposed around at least a portion of such spherical shaped member 58 disposed within the aperture 56 formed in such first end portion 48 of such at least one male connection member 50. In the presently preferred embodiment of the invention, such race assembly will be secured in a manner such that it can be readily removed from the first end portion 48 of such male connection member 50.

In addition, it is presently preferred that the slackless type drawbar assembly 10 further includes a substantially solid type lubricating liner member 70 disposed intermediate the outer surface 72 of such spherical shaped member 58 and such inner surface 68 of the race assembly. Preferably, such solid lubricating liner member 70 will be of the type manufactured by Kahr Bearing Co. under the Tradename "KARLON".

Another essential component of such slackless type drawbar assembly 10, according to the present invention, is a pair of wedge means, generally designated, 80. A first surface 74 of a first one of such pair of wedge means 80 is engaged with a first one of the radially opposed and substantially flat surface portions 64 formed on such pair of shaft members 60. The second surface 76 of such first one of the pair of wedge means 80 is engaged with a substantially flat and vertically disposed surface portion 78 formed on the first one of such pair of side wall portions 34 adjacent a portion of the first opening 40. Likewise, a first surface (not shown) of a second one (not shown) of such pair of wedge means 80 is engaged with a second one of such radially opposed and substantially flat surface portions 64 formed on such pair of shaft members 60 and a second surface (not shown) of the second one of said pair of wedges means 80 is engaged with a substantially flat and vertically disposed surface portion formed on the second one of such pair of side wall portions 34 adjacent a portion of such second opening 42.

In the presently preferred embodiment of the invention, such pair of wedge means 80 includes a first wedge member 82 and a second wedge member (not shown). As best seen in FIG. 2, each of such first wedge member 82 and the second wedge member has a bolt 84 disposed therethrough in a substantially longitudinal direction and washer means 86. The first wedge member 82 includes the first tapered surface 74 engaged with the first flat surface portion 64 of such radially opposed and substantially flat surface portions 64 formed on such pair of shaft members 60 and a substantially flat and vertically disposed second surface 76 which is engaged with a mating vertical surface 78 disposed on such first opening 40 formed through the first one of such pair of side wall portions 34.

The second wedge member (not shown) but, preferably, substantially identical to such first wedge member 82 includes a tapered surface (not shown) engaged with a second flat surface portion of such radially opposed and substantially flat surface portions 64 formed on the pair of shaft members 60 and a substantially flat and vertically disposed surface (not shown) on such second wedge member is engaged with a mating vertical surface (not shown) disposed on such second opening 42 formed through the second one of such pair of side wall portions 34.

Another essential element of the present invention is a means, generally designated 90, engageable with such second end portion 52 of the at least one male connection member 50 and a second end portion (not shown) of another male connection member (not shown) for securing such second end portion 52 of the at least one male connection member 50 to the second end portion of such other male connection member thereby forming an improved slackless type drawbar assembly 10.

According to one embodiment of the present invention, such means 90 for engagement with such second end portion 52 of the at least one male connection member 50 and the second end portion of such other male connection member for securing them together may be a simple weldment 88.

In a presently preferred embodiment of the invention, however, such means 90 engageable with the second end portion 52 of such at least one male connection member 50 and the second end portion of such other male connection member for securing them together will include at least one of a bar-like member (not shown) and a pipe-like member 92 disposed intermediate and secured to such second end portion 52 of the at least one male connection member 50 and the second end portion of such other male connection member. In the case where such pipe-like member is used it is possible that the second end portion 52 of such first male connection member 50 and the second end of such second male connection member include a male member (not shown) inserted into respective opposed ends of such pipe-like member 92.

According to the most preferred embodiment of the invention, such improved slackless type drawbar assembly 10 will further include a second female connection member (not shown) which is substantially identical to such first female connection member 20. Like the first female connection member 20, such second female connection member includes a first end portion, having a seventh predetermined configuration to enable such first end portion of the second female connection member to be engaged within an outer end portion (not shown) of a center sill member (not shown) disposed on a bottom portion (not shown) of a car body member (not shown) of a second railway car (not shown) and a radially opposed second end portion which extends outwardly from such outer end portion of such center sill member of the second railway car.

A second cavity is formed in the radially opposed second end portion of such second female connection member. This second cavity, like the first cavity 18, is defined by an inner surface of a back wall portion, having an eighth predetermined configuration, an inner surface of a top wall portion and an inner surface of a pair of side wall portions. The inner surface of each side wall portion having a ninth predetermined configuration. Such second cavity is, preferably, also open adjacent at least a portion of a bottom and an outer end of such radially opposed second end portion of the second female connection member. In this embodiment of the invention, the eighth predetermined configuration of such inner surface of the back wall portion of such second female connection member will be substantially identical to such back wall portion 24 of the cavity 18 formed in the second end portion 30 of such at least one female connection member 20. Further, the ninth ninth predetermined configuration of the inner surfaces of each of such pair of side wall portions of the second end portion of such second female connection member will be substantially identical to the third predetermined configuration of such inner surfaces 32 of each of such pair of side wall portions 34 of such cavity 18 formed in the second end portion 30 of the at least one female connection member 20.

Additionally, a first opening, having a tenth predetermined configuration, is formed through a first one of such pair of side wall portions of the second end portion of such second female connection member and a radially opposed second opening, having an eleventh predetermined configuration, is formed through a second one of such pair of side wall portions of the second end portion of such second female connection member. Preferably, in this embodiment of the invention, the tenth predetermined configuration of such opening formed through the first one of such pair of side wall portions of the second end portion of such second female connection member and the eleventh predetermined configuration of such radially opposed opening formed through the second one of such pair of side wall portions of such second end portion of the second female connection member at least includes a generally round portion and a generally open bottom portion.

A second male connection member (not shown), having a twelfth predetermined configuration, is provided in the presently preferred embodiment of the invention. Such second male connection member includes a first end portion in which at least a portion thereof is movably disposed within such second cavity formed in such radially opposed second end portion of such second female connection member and a radially opposed second end portion. Like the first end portion 48 of the first male connection member 50 such first end portion of this second male connection member includes a surface, disposed facing the inner surface of such back wall portion of the second female connection member which is convex shaped in each of a vertical direction and a horizontal direction.

In addition, there is a second aperture formed through a predetermined portion of such second male connection member adjacent the first end portion thereof.

The preferred embodiment of this invention further includes a second spherical shaped member (not shown) having at least a portion thereof disposed within such second aperture formed through such first end portion of the second male connection member. A second pair of substantially horizontally disposed shaft members (not shown) extend outwardly for a predetermined distance from radially opposed and substantially vertically disposed outer surfaces of such second spherical shaped member. At least a portion of a first one of such second pair of shaft members being disposed within the first opening formed through such first one of the pair of side wall portions of such second end portion of the second female connection member and at least a portion of a second one of such pair of shaft members being disposed within the second opening formed through the second one of such pair of side wall portions. Each respective one of such second pair of shaft members has a radially opposed and substantially flat surface portion formed thereon.

A second race assembly (not shown) having at least a portion thereof disposed within such second aperture is secured to the first end portion of such second male connection member. An inner surface of this second race assembly is disposed around such at least a portion of the second spherical shaped member disposed within such second aperture formed in the first end portion of such second male connection member.

Additionally, there is a second pair of wedge means (not shown) provided. A first surface of a first one of such second pair of wedge means is engaged with a first one of such radially opposed and substantially flat surface portions formed on the second pair of shaft members and a second surface of such first one of the second pair of wedge means is engaged with a substantially flat and vertically disposed surface portion formed on the first one of such pair of side wall portions of the second end portion of such second female connection member adjacent a portion of such first opening. Likewise, a first surface of a second one of such second pair of wedge means is engaged with a second one of such radially opposed and substantially flat surface portions formed on the second pair of shaft members and a second surface of such second one of such second pair of wedge means is engaged with a substantially flat and vertically disposed surface portion formed on the second one of such pair of side wall portions of the second end of such second female connection member adjacent a portion of the second opening.

Preferably, the improved slackless type drawbar assembly 10 further includes a second substantially solid type lubricating liner member (not shown) disposed intermediate an outer surface of such second spherical shaped member and the inner surface of such second race assembly.

According to the presently preferred embodiment of the invention, such second race assembly is removably secured to such first end of the second male connection member. In addition, such second spherical shaped member and such second pair of shaft members are formed as an integral single piece component. Further, such second pair of wedge means will include a first and a second wedge member. Each of such first and second wedge members have a bolt disposed therethrough in a longitudinal direction and washer means. The first one of such second pair wedge members includes a tapered surface engaged with a first flat surface portion of the axially opposed and substantially flat surface portions formed on such second pair of shaft members and a substantially flat and vertical surface disposed on such first one of the second pair of wedge members is engaged with a mating vertical surface disposed on such first opening formed through the first one of such pair of side wall portions of the second end portion of such second female connection member. The second one of such second pair of wedge members includes a tapered surface engaged with a second flat surface portion of such radially opposed and substantially flat surface portions formed on such pair of shaft members and a substantially flat and vertically disposed surface on the second one of such first and second wedge members is engaged with a mating vertical surface disposed on the second opening formed through such second one of such pair of side wall portions of such second female connection member.

While a number of presently preferred and various alternative embodiments of the present invention have been described in detail above, with particular reference to the drawing Figures, it should be understood by those persons who are skilled in the railway car type coupling art that it is possible for a number of additional modifications and/or other adaptations of such slackless type drawbar assembly to be made without departing from either the spirit or the scope of the appended claims.

We claim:

1. An improved slackless type drawbar assembly for use in connecting together adjacently disposed ends of a pair of railway cars in a substantially semi-permanent fashion, said slackless type drawbar assembly comprising:
   (a) at least one female connection member, said at least one female connection member including;
      (i) a first end portion, having a first predetermined configuration, engageable within an outer end portion of a center sill member disposed on a bottom portion of a car body member of a first railway car, and
      (ii) a radially opposed second end portion which extends outwardly from such outer end portion of such center sill member;
   (b) a cavity formed in said radially opposed second end portion of said at least one female connection member, said cavity being defined by an inner surface of a back wall portion, having a second predetermined configuration, an inner surface of a top wall portion and inner surfaces of a pair of side wall portions, each side wall portion having a third predetermined configuration, said cavity being open adjacent at least a portion of a bottom and an outer end of said radially opposed second end portion of said at least one female connection member;
   (c) a first opening, having a fourth predetermined configuration, formed through a first one of said pair of side wall portions;
   (d) a radially opposed second opening, having a fifth predetermined configuration, formed through a second one of said pair of side wall portions;
   (e) at least one male connection member having a sixth predetermined configuration, said at least one male connection member including;
      (i) a first end portion, at least a portion of said first end portion of said at least one male connection member being movably disposed within said cavity formed in said radially opposed second end portion of said at least one female connection member, and
      (ii) and a radially opposed second end portion;
   (f) an aperture formed through a predetermined portion of said at least one male connection member adjacent said first end portion thereof;
   (g) a spherical shaped member, at least a portion of said spherical shaped member being disposed within said aperture formed through said first end portion of said at least one male connection member;
   (h) a pair of substantially horizontally disposed shaft members extending outwardly for a predetermined distance from radially opposed and substantially vertically disposed outer surface portions of said spherical shaped member, at least a portion of a first one of said pair of shaft members being disposed within said first opening formed through said first one of said pair of side wall portions and at least a portion of a second one of said pair of shaft members being disposed within said second opening formed through said second one of said pair of side wall portions, each respective one of said pair of shaft members has a radially opposed and substantially flat surface portion formed thereon;
   (i) a pair of wedge means, a first surface of a first one of said pair of wedge means being engaged with a first one of said radially opposed and substantially flat surface portions formed on said pair of shaft members and a second surface of said first one of said pair of wedge means being engaged with a substantially flat and vertically disposed surface portion formed on said first one of said pair of side wall portions adjacent a portion of said first opening and a first surface of a second one of said pair of wedge means being engaged with a second one of said radially opposed and substantially flat surface portions formed on said pair of shaft members and a second surface of said second one of said pair of wedges means being engaged with a substantially flat and vertically disposed surface portion formed on said second one of said pair of side wall portions adjacent a portion of said second opening; and
   (j) a means, separate from a railway car center sill, adapted for engaging said second end portion of said at least one male connection member and a second end portion of another male connection member for securing said second end portion of said at least one male connection member to said second end portion of said another male connection member thereby forming an improved slackless type drawbar assembly.

2. An improved slackless type drawbar assembly, according to claim 1, wherein said assembly further includes a substantially solid lubricating liner member disposed on an outer surface of said spherical shaped member.

3. An improved slackless type drawbar assembly, according to claim 1, wherein said first predetermined configuration of said first end portion of said at least one female connection member is generally rectangular.

4. An improved slackless type drawbar assembly, according to claim 1, wherein said second predetermined configuration of said inner surface of said back wall portion of said cavity formed in said second end portion of said female connection member is generally concave in at least one of a vertical direction and a horizontal direction.

5. An improved slackless type drawbar assembly, according to claim 4, wherein said second predetermined configuration of said inner surface of said back wall portion of said cavity formed in said second end portion of said female connection member is generally concave in both said vertical direction and said horizontal direction.

6. An improved slackless type drawbar assembly, according to claim 4, wherein said third predetermined, configuration of said inner surface
of each of said pair of side wall portions of said cavity formed in said second end portion of said female connection member is generally convex shaped in at least a horizontal direction.

7. An improved slackless type drawbar assembly, according to claim 6, wherein said third predetermined configuration of said inner surface
of said each of said pair of side wall portions of cavity formed in said second end portion said female connection member is generally convex shaped in both said horizontal direction and a vertical direction.

8. An improved slackless type drawbar assembly, according to claim 1, wherein said first end portion of said male connection member includes an end surface, disposed facing said inner surface of said back wall portion of said cavity formed in said second end portion of said female connection member, which is convex shaped in at least one of a vertical direction and a horizontal direction.

9. An improved slackless type drawbar assembly, according to claim 8, wherein said first end portion of said male connection member includes an end surface, disposed facing said inner surface of said back wall portion of said cavity formed in said second end portion of said female connection member, said end surface is convex shaped in both said vertical direction and said horizontal direction.

10. An improved slackless type drawbar assembly, according to claim 1, wherein said fourth predetermined configuration of said first opening formed through said first one of said pair of side wall portions and said fifth predetermined configuration of said radially opposed second opening formed through said second one of said pair of side wall portions at least includes a generally round portion and a generally open bottom portion.

11. An improved slackless type drawbar assembly, according to claim 1, wherein said aperture formed through said predetermined portion of said at least one male connection member adjacent said first end thereof is generally round and has a first predetermined diameter.

12. An improved slackless type drawbar assembly, according to claim 1, wherein said spherical shaped member and said pair of shaft members are formed as an integral single piece component.

13. An improved slackless type drawbar assembly, according to claim 1, wherein said spherical shaped member includes a chrome plating on at least a portion of an outer surface thereof.

14. An improved slackless type drawbar assembly, according to claim 13, wherein said chrome plating on said at least a portion of outer surface of said spherical shaped member is polished.

15. An improved slackless type drawbar assembly, according to claim 1, wherein said pair of wedge means includes first and second wedge members, each of said first and second wedge members having a bolt disposed therethrough in a longitudinal direction and washer means, said first wedge member includes said tapered surface engaged with said first flat surface portion formed on said pair of shaft members and said first wedge member includes said substantially flat and vertically disposed surface engaged with said mating vertical surface disposed on said first opening formed through said first one of said pair of side wall portions and a second one of said first and second wedge members includes said tapered surface engaged with said second flat surface portion formed on said pair of shaft members and said second wedge member includes said substantially flat and vertically disposed surface engaged with said mating vertical surface disposed on said second opening formed through said second one of said pair of side wall portions.

16. An improved slackless type drawbar assembly, according to claim 1, wherein said means adapted for engaging said second end portion of said at least one male connection member and said second end portion of said another male connection member for securing said second end portion of said at least one male connection member to said second end portion of said another male connection member is a weldment.

17. An improved slackless type drawbar assembly, according to claim 1, wherein said means adapted for engaging said second end portion of said at least one male connection member and said second end portion of said another male connection member for securing said second end portion of said at least one male connection member to said second end portion of said another male connection member includes at least one of a bar-like member and a pipe-like member disposed intermediate and secured to said second end portion of said at least one male connection member and said second end portion of said another male connection member.

18. An improved slackless type drawbar assembly, according to claim 17, wherein said pipe-like member is disposed intermediate and secured to said second end of said first male connection member and said second end of said second male connection member and each of said second end of said first male connection member and said second end of said second male connection member include a male member inserted into respective opposed ends of said pipe-like member.

19. An improved slackless type drawbar assembly, according to claim 1, wherein said slackless drawbar assembly further includes:
(a) a second female connection member, said second female connection member including;
(i) a first end portion, having a seventh predetermined configuration, engageable within an outer end portion of a center sill member disposed on a bottom portion of a car body member of a second railway car, and
(ii) a radially opposed second end portion which extends outwardly from such outer end portion of such center sill member of such second railway car;
(b) a second cavity formed in said radially opposed second end portion of said second female connection member, said second cavity being defined by an inner surface of a back wall portion, having an eighth predetermined configuration, an inner surface of a top wall portion and inner surfaces of a pair of side wall portions, a respective inner surface of each side wall portion having a ninth predetermined configuration, said second cavity being open adjacent at least a portion of a bottom and an outer end of said radially opposed second end portion of said second female connection member;
(c) a first opening, having a tenth predetermined configuration, formed through a first one of said pair of side wall portions of said second female connection member;
(d) a radially opposed second opening, having an eleventh predetermined configuration, formed through a second one of said pair of side wall portions of said second female connection member;

(e) a second male connection member, having a twelfth predetermined configuration, said second male connection member including;
  (i) a first end portion, at least a portion of said first end portion of said second male connection member being movably disposed within said second cavity formed in said radially opposed second end portion of said second female connection member, and
  (ii) and a radially opposed second end portion;
(f) a second aperture formed through a predetermined portion of said second male connection member adjacent said first end portion thereof;
(g) a second spherical shaped member, a least a potion of said second spherical shaped member being disposed within said second aperture formed through said first end portion of said second male connection member;
(h) a second pair of substantially horizontally disposed shaft members extending outwardly for a predetermined distance from radially opposed and substantially vertically disposed outer surface portions of said second spherical shaped member, at least a portion of a first one of said second pair of shaft members being disposed within said first opening formed through said first one of said pair of side wall portions and at least a portion of a second one of said pair of shaft members being disposed within said second opening formed through said second one of said pair of side wall portions, each respective one of said second pair of shaft members has a radially opposed and substantially flat surface portion formed thereon;
(i) a second pair of wedge means, a first surface of a first one of said second pair of wedge means being engaged with a first one of said radially opposed and substantially flat surface portions formed on said second pair of shaft members and a second surface of said first one of said second pair of wedge means being engaged with a substantially flat and vertically disposed surface portion formed on said first one of said pair of side wall portions of said second end portion of said second female connection member adjacent a portion of said first opening and a first surface of a second one of said second pair of wedge means being engaged with a second one of said radially opposed and substantially flat surface portions formed on said second pair of shaft members and a second surface of said second one of said second pair of wedges means being engaged with a substantially flat and vertically disposed surface portion formed on said second one of said pair of side wall portions of said second end portion of said second female connection member adjacent a portion of said second opening.

20. An improved slackless type drawbar assembly, according to claim 19, wherein said slackless drawbar assembly further includes a second substantially solid lubricating liner member disposed on an outer surface of said second spherical shaped member.

21. An improved slackless type drawbar assembly, according to claim 19, wherein said eighth predetermined configuration of said inner surface of said back wall portion of said second end portion of said second female connection member is substantially identical to said inner surface of said back wall portion of said cavity formed in said second end portion of said at least one female connection member.

22. An improved slackless type drawbar assembly, according to claim 21, wherein said ninth predetermined configuration of said inner surface of each of said pair of side wall portions of said second end portion of said second female connection member is substantially identical to said third predetermined configuration of said inner surface of said each of said pair of side wall portions of said cavity formed in said second end portion of said at least one female connection member.

23. An improved slackless type drawbar assembly, according to claim 19, wherein said first end portion of said second male connection member includes a surface, disposed facing said inner surface of said back wall portion of said second end portion of said second female connection member, said surface is convex shaped in each of a vertical direction and a horizontal direction.

24. An improved slackless type drawbar assembly, according to claim 19, wherein said tenth predetermined configuration of said opening formed through said first one of said pair of side wall portions of said second end portion of said second female connection member and said eleventh predetermined configuration of said radially opposed opening formed through said second one of said pair of side wall portions of said second end portion of said second female connection member at least includes a generally round portion and a generally open bottom portion.

25. An improved slackless type drawbar assembly, according to claim 19, wherein said second spherical shaped member and said second pair of shaft members are formed as an integral single piece component.

26. An improved slackless type drawbar assembly, according to claim 19, wherein said second pair of wedge means includes first and second wedge members, each of said first and second wedge members having a bolt disposed therethrough in a longitudinal direction and washer means, said first of said wedge members includes said tapered surface engaged with a first flat surface portion of said axially opposed and substantially flat surface portions formed on said second pair of shaft members and a substantially flat and vertical surface disposed on said first of said second pair of wedge members is engaged with said mating vertical surface disposed on said first opening formed through said first one of said pair of side wall portions of said second female connection member and said second one of said wedge members includes said tapered surface engaged with said second flat surface portion of said radially opposed and substantially flat surface portions formed on said pair of shaft members and a substantially flat and vertically disposed surface on said second one of said first and second wedge members is engaged with said mating vertical surface disposed on said second opening formed through said second one of said pair of side wall portions of said second female connection member.

* * * * *